United States Patent Office 3,023,148
Patented Feb. 27, 1962

3,023,148
PRODUCTION OF 5-HYDROXYTETRACYCLINE
Philip Andrew Miller, Valley Cottage, and Jerry Robert Daniel McCormick, New City, N.Y., assignors to American Cyanamid Company, New York, N.Y., a corporation of Maine
No Drawing. Filed Dec. 1, 1960, Ser. No. 72,888
4 Claims. (Cl. 195—80)

This invention relates to the production of 5-hydroxytetracycline. More particularly it is concerned with a novel process for the production of 5-hydroxytetracycline involving the biological conversion of anhydrotetracycline to the biologically active material.

As is well known, 5-hydroxytetracycline is produced by the aerobic fermentation of an aqueous nutrient medium with microorganisms of the species *Streptomyces rimosus* as described in United States Patent to Sobin et al. No. 2,516,080.

In accordance with the present invention we have now discovered that this antibiotic may be produced by adding anhydrotetracycline to an actively growing culture of *S. rimosus* or *S. hydroscopicus* or *S. platensis* which are known to be capable of producing 5-hydroxytetracycline.

It is a surprising feature of the present invention that the relatively stable compound anhydrotetracycline can be converted biologically to 5-hydroxytetracycline. Furthermore, it is completely unexpected that the conversion would result in the hydroxylated compound rather than the expected antibiotic tetracycline. No reason is known why the hydroxylation takes place at the 5-position and no theory is advanced with respect thereto.

The conditions of the fermentation are generally the same as for the presently known methods of producing 5-hydroxytetracycline by fermentation with *S. rimosus* or *S. hydroscopicus* or *S. platensis* with the exception that anhydrotetracycline is added thereto in any desired amount. Thus, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, urea, corn steep liquor, distillers solubles, inorganic salts and other conventional substances. The inorganic salts include such things as calcium carbonate, ammonium sulfate, ammonium chloride, and salts of the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of 5-hydroxytetracycline shown in the United States Patent to Sobin et al. No. 2,516,080.

The invention will be described in greater detail in conjunction with the following specific examples.

EXAMPLE 1

*Preparation of inoculum medium*

An inoculum medium was prepared according to the following formula:

| | |
|---|---|
| Sucrose, grams | 30.0 |
| Corn steep liquor, milliliters | 16.5 |
| $(NH_4)_2SO_4$, grams | 2.0 |
| $CaCO_3$, grams | 7.0 |
| Water to 1000 milliliters. | |

Eight milliliter aliquots of this medium were placed in each of a series of test tubes and sterilized by autoclaving for 20 minutes under 15 pounds' pressure per square inch.

EXAMPLE 2

*Preparation of fermentation medium*

A fermentation medium was prepared according to the following formula:

| | Grams |
|---|---|
| $(NH_4)_2SO_4$ | 5.0 |
| $CaCO_3$ | 9.0 |
| $NH_4Cl$ | 1.5 |
| $MgCl_2 \cdot 6H_2O$ | 2.0 |
| $FeSO_4 \cdot 7H_2O$ | 0.04 |
| $MnSO_4 \cdot 4H_2O$ | 0.05 |
| $CoCl_2 \cdot 6H_2O$ | 0.005 |
| $ZnSO_4 \cdot 7H_2O$ | 0.1 |
| Corn steep liquor | 25.0 |
| Cottonseed meal | 2.0 |
| Corn starch | 55.0 |
| Water to 1000 milliliters. | |

Twenty-five milliliter portions of the medium were placed in 250 milliliter Erlenmeyer flasks and 0.5 milliliter of lard oil was added to each flask. The flasks containing the fermentation medium plus lard oil, closed with cotton plugs, were sterilized by autoclaving for 20 minutes at 15 pounds' pressure per square inch.

EXAMPLE 3

*Production of 5-hydroxytetracycline*

A suspension containing approximately $60 \times 10^6$ spores of *S. rimosus* NRRL 2234 per milliliter was made with sterile distilled water washings from a streaked agar slant. A 0.33 milliliter aliquot of this suspension was added to a test tube containing 8 milliliters of a sterile inoculum medium prepared according to Example 1. The inoculated tube was then incubated for 24 hours at 28° C. on a reciprocating shaker operating at 116 oscillations per minute. At the termination of this 24-hour incubation period, a 1.0 milliliter portion of this inoculum was added to a 250 milliliter Erlenmeyer flask containing 25 milliliters of a sterile fermentation medium prepared as shown in Example 2. This inoculated flask was incubated at 25° C. on a rotary shaker operating at 180 revolutions per minute for 48 hours. At the end of the 48-hour incubation period, a 3.0 milliliter aliquot of the growing mesh was transferred to a sterile shaker tube containing 5 microcuries of $C^{14}$-labeled anhydrotetracycline. The tube was mounted on a rotary shaker operating at 180 revolutions per minute and allowed to incubate for an additional 72 hours; making a total fermentation time of 120 hours. The tube was then removed, the mash diluted with 10 milliliters of 0.2 N hydrochloric acid and the mycelium removed by filtration. The filtrate was extracted by shaking with 1.5 milliliters of parachlorophenol. Ten microliter volumes of the phenol phase were spotted on a strip of Whatman #1 chromatograph paper which previously had been buffered by dipping in a 0.3 M $NaH_2PO_4$ solution adjusted to pH 3.0 with phosphoric acid and then air-dried. Subsequently, the strip was subjected to descending development for 18 hours using (I) the solvent system ethyl acetate:phosphate citrate buffer (pH 4.5) composed of equal volumes of 0.4 M $Na_2HPO_4$ and 4.5% citric acid and then system (II) nitromethane:benzene:pyridine buffer (pH 3.4) (20:10:3:3), the buffer being composed of 30 volumes of 0.2 M $Na_2HPO_4$ and 70 volumes of 2.24% citric acid. The developed, air-dried chromatogram strip was scanned for radioactivity by means of a Geiger-Muller counter. The appearance of a zone of radioactivity, representing $50 \pm 10\%$ of the $C^{14}$-labeled anhydrotetracycline added and having $R_f$ values of 0.58

(system I) and 0.24 (system II) corresponding to 5-hydroxytetracycline, demonstrated the conversion of anhydrotetracycline to 5-hydroxytetracycline.

EXAMPLE 4

*Production of 5-hydroxytetracycline*

A prodcedure similar to that shown in Example 3 was employed for the conversion of anhydrotetracycline to 5-hydroxytetracycline, except that *S. hydroscopicus* A-9538-1 was utilized instead of *S. rimosus* as the fermentative microorganism. Experimental results indicated a conversion of $C^{14}$-labeled anhydrotetracycline to $C^{14}$-labeled 5-hydroxytetracycline of $60\pm10\%$.

This application is a continuation-in-part of our application Serial No. 14,504, filed March 14, 1960.

We claim:

1. A process for producing 5-hydroxytetracycline which comprises cultivating a microorganism selected from the group consisting of Streptomyces rimosus, Streptomyces hydroscopicus and Streptomyces platensis in an aqueous nutrient medium containing assimilable sources of carbohydrate, nitrogen and inorganic salts under submerged aerobic conditions and in the presence of anhydrotetracycline whereby said anhydrotetracycline is biologically converted to 5-hydroxytetracycline.

2. A process for producing 5-hydroxytetracycline which comprises cultivating a microorganism selected from the group consisting of *S. rimosus* in an aqueous nutrient medium containing assimilable sources of carbohydrate, nitrogen and inorganic salts under submerged aerobic conditions and in the presence of anhydrotetracycline whereby said anhydrotetracycline is biologically converted to 5-hydroxytetracycline.

3. A process for producing 5-hydroxytetracycline which comprises cultivating a microorganism selected from the group consisting of *S. hydroscopicus* in an aqueous nutrient medium containing assimilable sources of carbohydrate, nitrogen and inorganic salts under submerged aerobic conditions and in the presence of anhydrotetracycline whereby said anhydrotetracycline is biologically converted to 5-hydroxytetracycline.

4. A process for producing 5-hydroxytetracycline which comprises cultivating a microorganism selected from the group consisting of *S. platensis* in an aqueous nutrient medium containing assimilable sources of carbohydrate, nitrogen and inorganic salts under submerged aerobic conditions and in the presence of anhydrotetracycline whereby said anhydrotetracycline is biologically converted to 5-hydroxytetracycline.

References Cited in the file of this patent

UNITED STATES PATENTS

| | | |
|---|---|---|
| 2,956,930 | Cheney et al. | Oct. 18, 1960 |
| 2,965,546 | McCormick et al. | Dec. 20, 1960 |

UNITED STATES PATENT OFFICE
CERTIFICATE OF CORRECTION

Patent No. 3,023,148                      February 27, 1962

Philip Andrew Miller et al.

It is hereby certified that error appears in the above numbered patent requiring correction and that the said Letters Patent should read as corrected below.

Column 1, line 23 and 36, column 3, lines 9 and 20, and column 4, line 9, for "hydroscopicus", in italics, each occurrence, read -- hygroscopicus --, in italics.

Signed and sealed this 15th day of January 1963.

(SEAL)
Attest:

ERNEST W. SWIDER
Attesting Officer

DAVID L. LADD
Commissioner of Patents